J. C. ATTERBURY.
TROLLEY SWITCH.
APPLICATION FILED SEPT. 4, 1913.
1,111,555.
Patented Sept. 22, 1914.
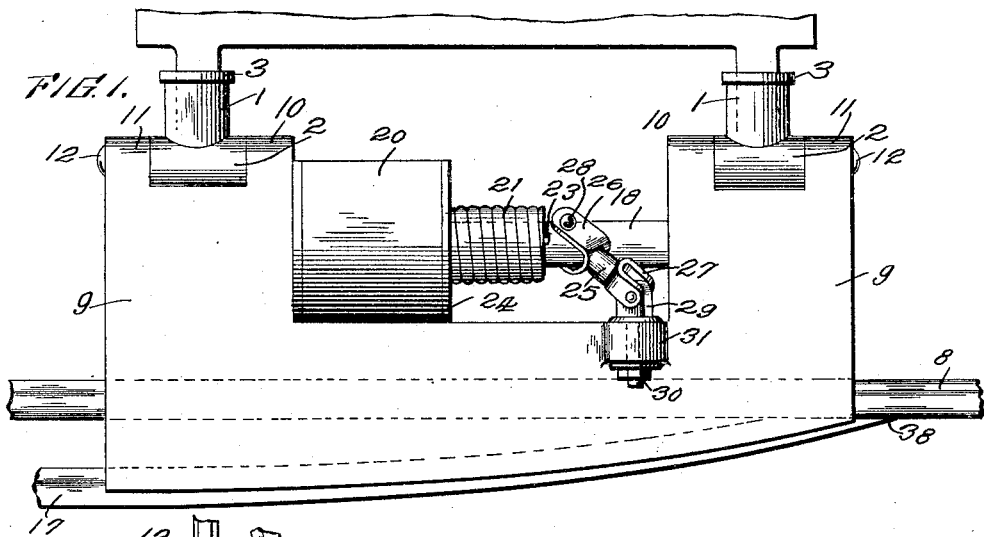
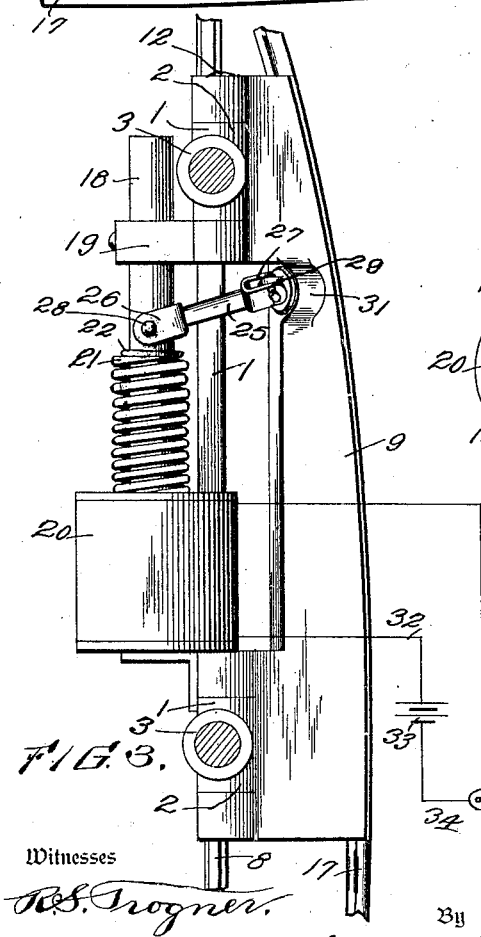
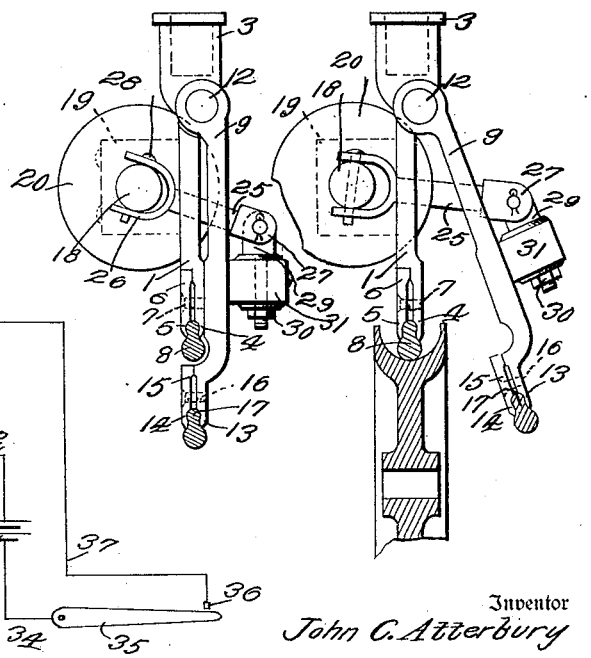
Inventor
John C. Atterbury
Witnesses
R. S. Trogner
W. H. Wakefield
By Mason Fenwick & Lawrence
Attorneys

UNITED STATES PATENT OFFICE.

JOHN C. ATTERBURY, OF DANVILLE, ILLINOIS, ASSIGNOR OF ONE-HALF TO CHARLES G. TAYLOR, OF DANVILLE, ILLINOIS.

TROLLEY-SWITCH.

1,111,555.  Specification of Letters Patent.  Patented Sept. 22, 1914.

Application filed September 4, 1913. Serial No. 788,144.

*To all whom it may concern:*

Be it known that I, JOHN C. ATTERBURY, a citizen of the United States, residing at Danville, in the county of Vermilion and State of Illinois, have invented certain new and useful Improvements in Trolley-Switches; and I do hereby declare the following to be a full, clear, and exact description of the invention, such as will enable others skilled in the art to which it appertains to make and use the same.

This invention relates to improvements in trolley switches, and an object of the invention is to provide a switch which may be thrown automatically at the same time that the track switch is thrown.

A still further object of the invention is to provide means for directing the trolley either along the main wire, or the branch wire connected with a movable switch point in such a way that the trolley will always be in contact with a live wire.

A further object of the invention is to provide an overhead trolley switch which may be operated by an electro-magnet or other suitable means acting upon a rotatably mounted reciprocating member which is connected to a swinging switch point hinged to the insulator support.

With these and other objects in view, the invention consists in certain novel constructions, combinations and arrangements of the parts which will be hereinafter fully described and claimed.

In the accompanying drawings wherein similar reference characters designate corresponding parts: Figure 1 is a side elevation of the switch showing the same in closed position to guide a trolley upon a branch line; Fig. 2 is an end elevation of the switch shown in Fig. 1 looking at the left hand end of Fig. 1; Fig. 3 is a top plan view of the switch; and Fig. 4 is an end elevation looking at the left hand end of Fig. 1 when the switch point is open, so that the trolley remains upon the main wire.

The general aim of the present invention is to provide a two-part switch having a rigid part connected to the ordinary trolley insulator and carrying a rotatably mounted reciprocating rod having a resilient connection with an electro-magnet. The movable part of the switch is connected by means of a link to the rotatable rod and the structure is so designed that under normal conditions when the switch is open the spring which affords the resilient connection between the rod and magnet, will force the rod which is in effect the core of the solenoid, forward from the magnet to extend the movable point away from the main wire. When it is desired to use the switch, the solenoid may be energized whereupon the link connecting the rod with the movable member will draw said movable member into contact with the main wire.

In the drawings I have shown the device as operated by means of an electro-magnet and a coöperating spring. The embodiment shown herein comprises a stationary member 1 having hinged portions 2 secured at each end thereof from which extend sockets 3 which may be secured to the ordinary insulator as used in trolley wire suspension. The lower edge of the stationary portion may have a grooved extension 4 which coöperates with the grooved end 5 of a removable plate 6 held by means of a screw or other suitable means 7, to the lower edge of the stationary member for the purpose of holding the main wire 8 in position. It is to be understood from this structure that the main wire 8 is held practically in the same position at all times, but can be removed by means of the detachable plate 6.

The movable part of the switch comprises a body 9 having hinged portions 10 and 11 which receive pins 12 passing through the hinged portions 10 and 11, and also the hinged portion 2 formed upon the upper ends of the stationary part of the switch, the pins 12 being practically in alinement so that the body or switch point 9 may swing to one side of the stationary member. The lower portion of the body 9 is provided with a slotted extending end 13 coöperating with the corresponding slotted end 14 carried by a removable plate 15 secured by means of screws or other suitable means 16 to the lower edge of the switch point for the purpose of holding the wire 17 to the switch point, said wire 17 being in connection with the trolley wire furnishing power to the branch of the system to which the switch is applied.

In order to provide means for moving the switch point 9, with respect to the stationary part of the switch, there is provided a rod or solenoid core (the particular embodiment shown herein) indicated at 18 having the forward end thereof slidably mounted in a bearing 19 carried by one end of the stationary member 1, and having the other end thereof received and guided by the solenoid 20 mounted in any suitable manner upon the stationary member 1. Surrounding that portion of the solenoid core adjacent the solenoid, is a helical spring 21 which may have the outer end thereof in engagement with a washer 22 secured to the core 18 for the purpose of transferring stored energy to the core 18, as shown in Fig. 3, or as shown in Fig. 1, the outer end of the spring may be secured directly to the rod 18 as shown at 23. The inner end of the helical spring 21 preferably acts upon one of the shield plates 24 forming the end of the solenoid 20.

In order that the reciprocating movement of the rod 18 may be imparted to the switch point 9, there is provided a link 25 having bifurcated ends 26 and 27 respectively, the end 26 being connected by means of a pin 28, to the core 18, made of magnetic material when the solenoid is used for actuating the same, while the end 27 is connected in any suitable manner to the joint 29 secured by means of a screw 30 to a boss 31 carried by the movable point 9. The screw 30 allows the joint 29 to rotate freely and by having the ends disposed as illustrated in Fig. 1, means is provided for affording practically a universal joint between the link 25 and the movable point 9. Preferably the arrangement of the bolts 12, the rod 18 and the joint 27 is substantially as shown in Fig. 1 with the rod 18 intermediate the bolts 12 and the joint 27.

When electro-magnetic means are used for operating the switch such as shown in the drawings, the solenoid 20 may be connected by means of a wire 32 to any source of current 33, which in turn is connected by means of a wire 34 to one end of a switch point 35, the outer end of which is adapted to close upon the contact 36 for closing circuit upon the solenoid by means of a wire 37 which is connected to said solenoid and switch point 36.

The switch is designed so that normally the solenoid 20 is deënergized and the spring 21 expanded to the position shown in Fig. 3, inasmuch as spring 21 is a compression spring, and has the free end thereof connected to the rod 18. Normally therefore, the device stands in a position shown in Fig. 4 with the movable wire 17 carried by the movable point 9 held out of contact with the main wire 8 carried by the stationary part of the switch by means of a link 25. When the track switch point is thrown to pass a car upon a branch line, contact will be made between the switch point and contact 36 whereupon the solenoid 20 will be energized in a manner already indicated, so that the solenoid core 18 will be sucked into the solenoid and the spring 21 placed under compression at the same time that link 25 has the end 26 thereof drawn horizontally away from the universal joint at the end 27 so that the distance between the movable and fixed parts of the switch decreases. The solenoid 20 is made strong enough to withdraw the core 18 until the forward end 38 of the wire 17 carried by the switch point 9, lies directly under main wire 8. An approaching trolley will therefore pass from the trolley wire 8 to the trolley wire 17 over the point 38 which frictionally engages the main wire 8, this manner of passing the trolley from one wire to another being old in the art. As long as the track switch at the point 35 engages the contact 36, the solenoid 20 will remain energized and the switch point 9 will have the wire carried thereby in contact with the main wire, but as soon as contact is broken at the track switch, the solenoid will become deënergized whereupon the spring 21 which is under compression, will expand to force the portion or point 9 away from the stationary part of the switch, as will be readily understood.

Should that portion of the branch wire 17 which is connected to the movable part of the switch, be dead, electrically, for a short distance beyond the switch, and the mechanism have worn, so that the point 38 is not held in contact with wire 8, yet it will be understood that the trolley which is spring actuated will press the branch wire 17 against the wire 8 so that said dead portion will be of the same potential as the main wire.

What I claim is:

1. A trolley switch comprising a fixed member, a movable member, said members being hingedly connected adjacent the upper ends thereof, a rotatable reciprocable rod carried by the fixed member, resilient means normally holding the rod extended, a link interposed between the rod and the movable member, and means for withdrawing the rod, said rod and link lying below the pivotal connection of the said members.

2. A trolley switch comprising a fixed member, a movable member hingedly connected to the upper portion of the fixed member, a rotatable reciprocable rod carried by the fixed member, a solenoid having the rod as a core, means interposed between the core and rod adapted to hold the latter extended normally and a link interposed between the rod and the movable member, the rod and link being located below the hinged connection of the members of the switch.

3. A switch comprising a fixed member, a movable hinged member connected to the upper portion of the fixed member, a reciprocable rod mounted upon the fixed member below and to one side of the pivotal connection of the members, a solenoid having the rod as a core, means interposed between the fixed member and rod adapted to hold the latter extended and a link extending from the rod and connected to the movable member at a point below and to the other side of the pivotal connection of the members.

In testimony whereof I affix my signature in presence of two witnesses.

JOHN C. ATTERBURY.

Witnesses:
 E. L. DALBEY,
 CHAS. G. TAYLOR.

Copies of this patent may be obtained for five cents each, by addressing the "Commissioner of Patents, Washington, D. C."